United States Patent [19]

Frank

[11] Patent Number: 4,746,348
[45] Date of Patent: May 24, 1988

[54] HORIZONTAL PRESS BENDING APPARATUS AND METHOD

[75] Inventor: Robert G. Frank, Murrysville, Pa.

[73] Assignee: PPG Industries, Inc., Pittsburgh, Pa.

[21] Appl. No.: 947,254

[22] Filed: Dec. 29, 1986

[51] Int. Cl.⁴ .................. C03B 23/03; C03B 27/00
[52] U.S. Cl. .......................................... 65/104; 65/106; 65/107; 65/114; 65/273; 65/290; 65/291
[58] Field of Search ............... 65/104, 106, 273, 290, 65/291, 114, 107

[56] References Cited

U.S. PATENT DOCUMENTS

| | | | |
|---|---|---|---|
| 2,442,242 | 5/1948 | Lewis | 65/273 |
| 3,253,899 | 5/1966 | McMaster | 65/107 X |
| 4,221,580 | 9/1980 | Frank . | |
| 4,265,650 | 5/1981 | Reese et al. . | |
| 4,285,715 | 8/1981 | Frank . | |
| 4,290,796 | 9/1981 | Reese et al. . | |
| 4,297,118 | 10/1981 | Kellar et al. . | |
| 4,430,110 | 2/1984 | Frank et al. . | |
| 4,433,993 | 2/1984 | Frank . | |
| 4,470,837 | 9/1984 | Seymour | 65/107 X |
| 4,508,556 | 4/1985 | Bennett et al. . | |
| 4,579,577 | 4/1986 | Claassen . | |

Primary Examiner—Arthur Kellogg
Attorney, Agent, or Firm—Andrew C. Siminerio

[57] ABSTRACT

A horizontal press bending arrangement wherein heat softened glass sheets are shaped between a lower mold with a sheet shaping surface having a generally convex upward elevational configuration and an upper vacuum mold. After shaping the shaped glass sheet is deposited on an adjustable tempering ring. The ring adjusts in size from a first configuration corresponding to the contours of the shaped sheet immediately after shaping, to a second configuration corresponding to the contours of the shaped sheet after it has been cooled.

26 Claims, 4 Drawing Sheets

HORIZONTAL PRESS BENDING APPARATUS AND METHOD

BACKGROUND OF THE INVENTION

1. Field of the Invention

This invention relates to bending of glass sheets, and in particular to a horizontal press bending arrangement wherein glass sheets are shaped between an upper female vacuum mold and a lower full surface male mold.

2a. Technical Considerations

Shaped and tempered glass sheets are widely used as side windows or rear windows in vehicles such as automobiles and the like. To be suitable for such applications, flat glass sheets must be shaped to precisely defined curvatures dictated by the shape and outline of the frames defining the window openings in the vehicle. It is also important that the side or rear windows meet stringent optical requirements and that the windows be free of optical defects that would tend to interfere with the clear viewing therethrough in their viewing area.

The commercial production of shaped glass sheets for such purposes commonly includes heating flat glass sheets to their heat softening temperature, shaping the heated glass to a desired curvature, and cooling the shaped sheets in a controlled manner to a temperature below the strain point temperature of the glass e.g., tempering, to strengthen the glass and increase its resistance to damage resulting from impact.

During such an operation, a glass sheet is conveyed along a substantially horizontal path that extends through a tunnel type furnace. The glass sheet is one of a series of sheets and is heated to its heat softening temperature and transferred, for example, by a vacuum pick-up and shuttle arrangement, into a shaping station adjacent to the furnace where the glass sheet is pressed between a pair of vertically aligned upper and lower shaping molds. The upper mold is generally a vacuum male mold, i.e., it has a generally convex sheet shaping surface that holds the heat softened glass sheet by suction thereagainst after shaping and the lower mold is generally a female mold, i.e., it has a generally concave sheet shaping surface complementing the shaping surface of the upper mold. After shaping, a transfer and tempering ring having an outline and elevational contour conforming to that desired for the glass sheet slightly inboard of its perimeter moves downstream into a position below the upper vacuum mold. Release of the vacuum deposits the glass sheet onto the tempering ring which supports the peripheral portion of the glass while it conveys the glass sheet into a cooling station for rapid cooling.

As stylists continue to strive toward more aerodynamic vehicle designs, the bent shape of the glass sheets are becoming more complex. These designs include small radius bends, reverse curvatures in both the longitudinal and transverse direction, and tight dimensional and contour tolerances. These types of shapes are becoming increasingly more difficult to form using conventional pressing techniques. The shaped glass sheets are generally formed by pressing the end portions of the heat softened sheets upward relative to the central portions of the sheet. As a result, in order to conform with the shaping surfaces of the molds, portions of the glass sheets are forced in a direction opposite to its natural tendency to sag downwardly due to gravity. In some instances, the glass sheets must be heated to temperatures well above the normal heat softening temperature of 1050° F. to 1150° F. (566° C. to 621° C.), so that the glass is pliable enough to attempt to form these complex shapes. In addition, it has been found that the shaped glass sheet will shrink in size from an initial configuration immediately after shaping to a final configuration after tempering. Depending on the overall configuration, this shrinkage may adversely affect the optical quality of the shaped glass sheet.

It would be advantageous to have a press bending arrangement that could form these complex shapes in the glass sheets while maintaining the quality optics required for use in vehicles.

2b. Patents of Interest

U.S. Pat. No. 4,290,796 to Reese et al teaches a glass sheet shaping apparatus for press bending glass doublets. Bending irons support the glass sheets as the irons are conveyed through a heating lehr, to preform the glass sheets by gravity sagging. The bending irons stop at a shaping station in approximate alignment between a pair of upper and lower vertically aligned pressing molds. The upper mold includes a full-face male pressing surface and the lower mold includes a full-face female pressing surface. The glass sheets are lifted off of the bending iron by the lower shaping mold and pressed between the complementing shaping surfaces. The shaped glass is then redeposited onto the bending iron which transfer the shaped glass out of the shaping station for subsequent cooling.

U.S. Pat. Nos. 4,221,580; 4,285,715; and 4,433,993 to Frank and U.S. Pat. No. 4,330,110 to Frank et al teach a horizontal press bending operation wherein heated glass sheets enter a shaping station and are lifted off run-in conveyor rolls by a slotted mold. The glass sheet is pressed between the slotted lower mold and a shaped upper vacuum mold having a full-face male pressing surface. After pressing, the lower mold is retracted to a position beneath the run in rolls. A shuttling tempering ring is positioned below the vacuum mold and the vacuum is released so that the shaped glass is deposited onto the tempering ring. The ring subsequently transfers the shaped glass to a quenching station to temper the bent glass sheet.

U.S. Pat. No. 4,297,118 to Kellar et al teaches a shuttling, deformable vacuum mold that engages a heated glass sheet within a heating furnace. The deformable mold may change its surface engaging configuration from a flat surface to a convex shaping surface while engaging the glass sheet. The deformable vacuum mold deposits the shaped glass sheet onto a shuttling tempering ring that is positioned beneath the mold. After depositing the glass, the vacuum mold shuttles to a position outside of the furnace to cool prior to reentering the furnace to engage the next glass sheet.

U.S. Pat. No. 4,508,556 to Bennett et al teaches a method of press bending a glass sheet to an S-shaped cross-sectional configuration. The glass sheet is conveyed on a gas hearth support where it is heated to its heat softening temperature and transferred into a shaping station which includes an auxiliary glass hearth to support the glass sheet. The downstream end of the auxiliary gas hearth is curved downward to impart an initial curved configuration to the heated glass sheet. A ring-type shaping mold which surrounds the gas hearth lifts the glass sheet and presses it against an upper full-face vacuum mold to impart the final shaped configuration. After shaping, the ring mold is retracted and a tempering ring is moved beneath the upper vacuum male mold to receive the shaped glass sheet and remove it for tempering.

SUMMARY OF THE INVENTION

An object of the present invention is to provide an apparatus for shaping heat softened glass sheets. The glass sheets are heated to their heat softened temperature and transferred to a shaping station that includes an upper vacuum mold with a shaping surface having a generally concave downward elevational configuration corresponding to a final desired configuration of the glass sheet and a vertically aligned lower mold with a shaping surface complementing the shaping surface of the upper mold. The glass sheet is pressed between the upper and lower molds and deposited on a tempering ring having a glass sheet supporting surface with an elevational contour corresponding to the desired contour of the shaped glass sheet slightly inboard of the glass sheet perimeter. The tempering ring is adjustable from a first configuration wherein the ring supports the glass sheet while the sheet is in an expanded configuration to a final configuration corresponding to the final desired contour of the sheet after cooling. The tempering ring includes first and second sheet supporting portions which move relative to each other to adjust the ring from its initial, expanded configuration to its final, contracted configuration.

An additional object of the present invention is to provide a tempering ring for supporting hot shaped glass sheets. The tempering ring includes first and second portions of a glass sheet support mounted to a frame. The first and second portions move relative to each other. In one particular embodiment of the invention, the first portion of the support is rigidly secured to a first intermediate frame which in turn is secured to a main frame and the second portion of the support is secured to a second intermediate frame which is slideably mounted to the main frame. A bar member extends from the second intermediate frame and is received within an apertured sleeve member secured to the first intermediate frame. Actuators may be used to automatically move the second portion of the support relative to the first portion so as to contract and expand the tempering ring. The bar member may include finger members engaged by a yoke that is pivotally connected to the main frame in a manner such that when the yoke is pivoted in a first direction, the first and second portions of the support move towards each other i.e., the tempering ring contracts, and when the yoke member is pivoted in an opposition direction the first and second portions of the support move away from each other i.e., the tempering ring expands. The tempering ring may include spring members to bias the second portion away from the first portion so that the tempering ring assumes the expanded configuration.

Still another object of this invention is to provide a method of shaping heat softened glass sheets. The sheets are heated to their heat softening temperature and deposited at a shaping station including a lower mold with a shaping surface having a generally convex upward elevational configuration. The sheet is shaped between the lower mold and a vertically aligned upper mold having a shaping surface complementing the shaping surface of the lower mold. The shaped sheet is then removed from the shaping station and cooled. The sheet may be removed by depositing it on a tempering ring having a glass sheet supporting surface with an elevational contour corresponding to the contour of the shaped sheet slightly inboard of the sheet perimeter. The configuration of the tempering ring may be adjusted from a first configuration corresponding to the contours of the glass sheet immediately after shaping to a second configuration corresponding to the contours of the glass sheet after cooling.

A further object of this invention is to provide a method for supporting a hot shaped glass sheet. The glass sheet is supported about its periphery on a tempering ring having an initial configuration corresponding to the peripheral contour of the shaped glass sheet immediately after shaping while the sheet is still hot and in an expanded configuration. As the glass sheet cools and shrinks in dimension, the tempering ring is adjusted to a final configuration such that the ring supports the sheet about its periphery after the glass sheet has been cooled. The dimensions of the tempering ring may be adjusted while the glass sheet is cooling, with the rate of adjustment corresponding to the rate of shrinkage of the shaped glass sheet.

The present invention provides a method and apparatus for shaping sheets into complex and compound configurations and maintaining the desired shape. By providing an adjustable tempering ring, the periphery of the shaped glass sheet can be properly supported both immediately after the shaping operation and after the tempering operation.

DETAILED DESCRIPTION OF THE INVENTION

The present invention is presented with respect to shaping and tempering of glass sheets, but it should be appreciated that the invention may be used in other shaping arrangements and/or with other materials that are shaped to complex configuration and where shrinkage due to cooling causes similar problems.

Figure 1:
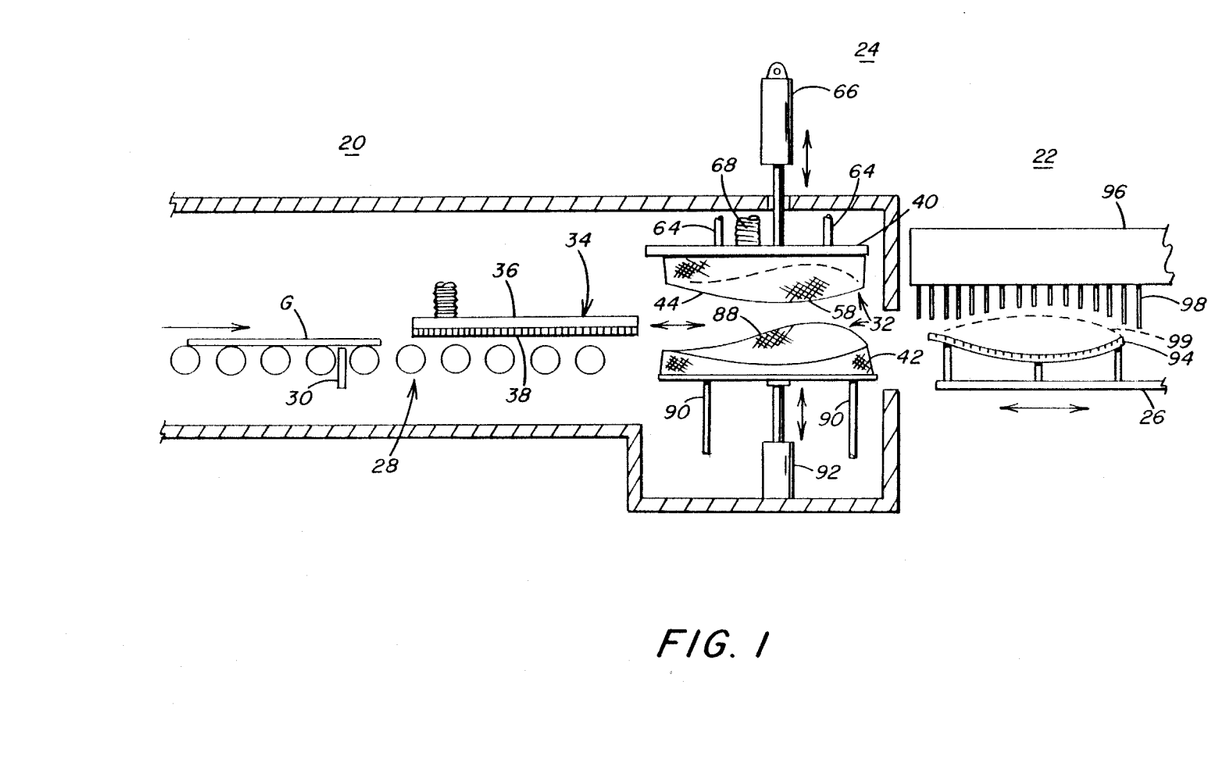
FIG. 1 is an elevational view of a glass sheet shaping and tempering arrangement incorporating the novel features of the present invention.
Figure 2:
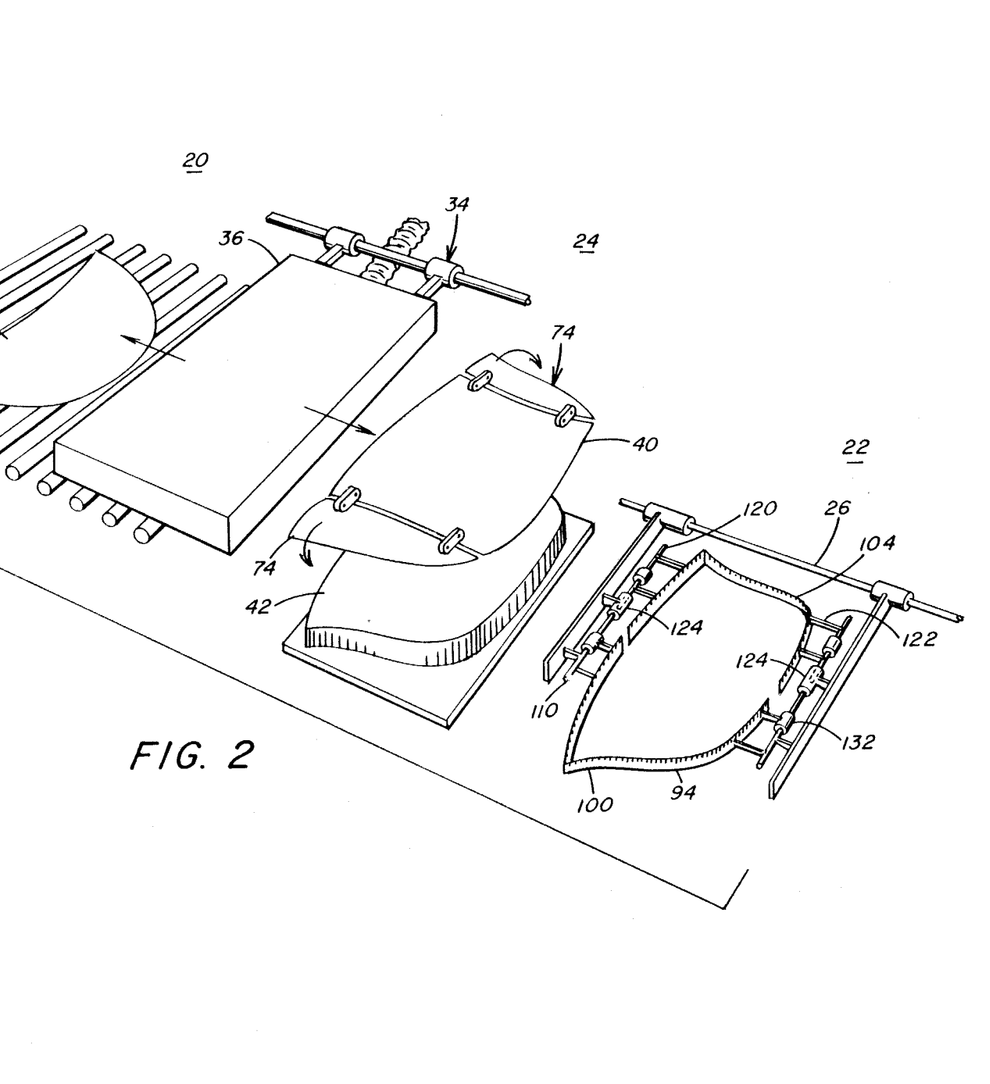
FIG. 2 is an isometric view of the invention shown in FIG. 1 illustrating the vacuum pick-up, pressing mold arrangement, and transfer ring system.

Referring to FIGS. 1 and 2, an apparatus for heating and shaping sheets of material, such as glass, includes a furnace 20 through which sheets of glass G are conveyed while being heated to their heat deformation temperature. A cooling station 22 for cooling the curved glass sheets and an unloading station (not shown) is located beyond the cooling station 22 to the right of the furnace 20. A shaping station 24 is disposed between the furnace 20 and the cooling station 22. A sheet transfer device 26 located in the cooling station 22 transfers the shaped glass sheets from the shaping station 24 to the cooling station 22.

Heat may be supplied to the furnace 20 in any convenient manner, for example, from gas burners or by electrical radiant heaters or by a combination of both which heat supplies means are well known in the art. In the particular embodiment illustrated in FIGS. 1 and 2, the furnace 20 includes a horizontal conveyor comprising longitudinally spaced, transversely extending conveyor rolls 28 that define a path of travel which extends through the furnace 20. The conveyor rolls 28 may be arranged in sections so that the speed of the different conveyor sections may be controlled and synchronized in a manner well known in the art for proper movement and positioning of glass sheets G through the furnace 20. It should be appreciated that although FIGS. 1 and 2 illustrate a conveyer including conveyor rolls 28, the furnace 20 is not meant to be so limited, and as an alternate may include a gas hearth support and conveying arrangement is disclosed in U.S. Pat. No. 4,508,556 to Bennett et al., which teaching are hereby incorporated by reference. A glass sensing member 30 (shown only in FIG. 1) is located within the furnace 20 to initiate a cycle of operation for bending as will be discussed later.

The shaping station 24 includes a pair of vertically aligned upper and lower pressing molds 32. It should be appreciated that if it is required that the shaping station 24 be heated, it may be included within the furnace 20 as shown in FIG. 1 or in a separately heated chamber (not shown).

A transfer device 34 engages the heat softened glass sheet G within the furnace 20 and moves it into the shaping station 24. Although not limited in the present invention, the particular embodiment illustrated in FIGS. 1 and 2 uses a shuttling vacuum pick-up 36. The pick-up 36 is positioned at the exit end of the furnace 20 where it draws a vacuum to lift a glass sheet G against its sheet engaging surface 38. If required, auxiliary lifters may be used to lift the glass sheet G into engagement with the pick-up 36. The pick-up 36 then travels to a position between the molds 32 where it terminates the vacuum and deposits the heat softened glass sheet G at the shaping station 24. The pick up 36 thereafter moves out of the shaping station 24, either back into the furnace 20 or to a position adjacent to the shaping station 24 (not shown).

It should be appreciated that the transfer device 34 may also be shuttling (not shown) platen that has a downwardly facing surface through which a vacuum can be drawn to support the heat softened glass sheet and pressurized gas is supplied so as to spaced the sheet from the surface such the sheet is held without the sheet physically contacting the surface of the platen, similar to that disclosed in U.S. Pat. No. 4,578,103 which teaching are hereby incorporated by reference.

Figure 3:
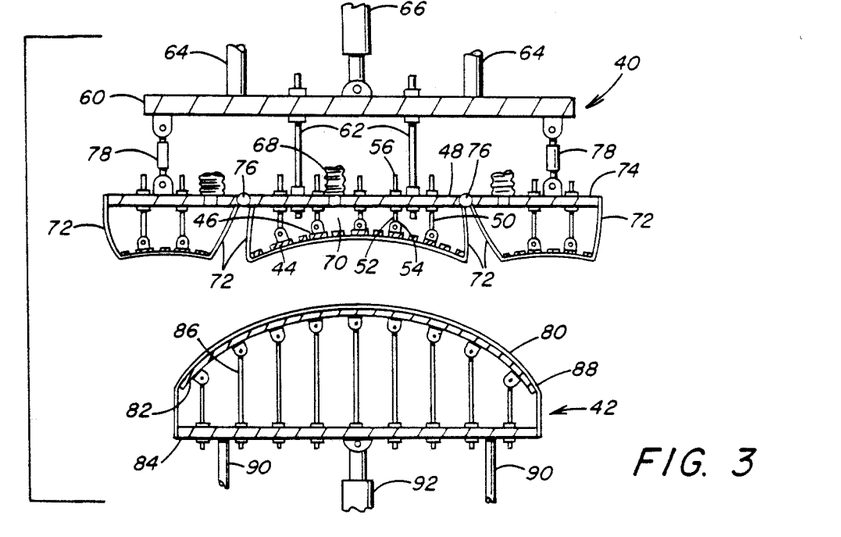
FIG. 3 is a view through line 3—3 in FIG. 1 showing the upper and lower pressing molds in a spaced, non-pressing relationship, with portions removed for clarity.

The shaping station 24 includes an upper full surface vacuum mold 40 and a lower mold 42. The upper mold 40 includes a downwardly facing female press face 44, i.e, the press face 44 is generally concave downward in elevation as shown in FIG. 3. The surface of the female press face 44 conforms to the final desired configuration of the glass sheet G to be shaped. Although not limiting to the present invention, the upper mold 40 may be similar in construction to that disclosed in U.S. Pat. No. 4,579,577 to Claassen, which teachings are hereby incorporated by reference. Referring to FIG. 3, the press face 44 of the upper mold 40 is preferably an apertured and flexible metal wall 46 constructed from any flexible, heat resistant material, e.g. steel, which is connected to an upper mounting plate 48 through a plurality of adjustable connectors 50. The connectors 50 include a rod 52 with a first end 54 pivotally connected to the inner surface of the wall 46 and an opposite end 56 extending through and adjustably secured to the mounting plate 48 so that the contours of the lower press face can be modified. The upper mold 40 may be covered with a refractory cloth cover 58, such as fiberglass to insulate the glass from the mold. The cover 58 is drawn across apertured press face 44 and secured to mounting plate 48 in any convenient manner, e.g., clamps.

With continued reference to FIG. 3, plate 48 is attached to a rigid back plate 60 by connectors 62 which in turn is suitably connected through upper vertical guides 64 to an upper support frame (not shown) and is movable relative thereto by an upper piston 66.

Referring to FIGS. 1 and 3, the upper vacuum mold 40 communicates with a source of vacuum (not shown) through an evacuation line 68 as will be discussed later. The source of pressurized air (not shown) and the valves for the vacuum and pressure line may be synchronized according to a predetermined time cycle as will be discussed later.

Vacuum chamber 70 of the upper vacuum mold 40 may be formed by spanning the open edge area between the mounting plate 48 and the wall 42 with a non-porous, heat resistant material to seal the chamber 70. Although not limiting in the present invention, in the particular embodiment illustrated in FIGS. 1-3, the peripheral portion 72 of the fiberglass cover 58 spanning between the mounting plate 48 and wall 42 may be coated with a heat resistant silicon rubber, for example, Dow Corning 736 Silastic ® RTV or any other heat resistant sealant to prevent air flow therethrough and provide a vacuum seal. When vacuum is drawn in the vacuum chamber 70 through the evacuation line 68, the coated fiberglass cloth seals the space between the wall 46 and mounting plate 46 so that air enters chamber 70 only through the apertured wall 46.

Figure 4:
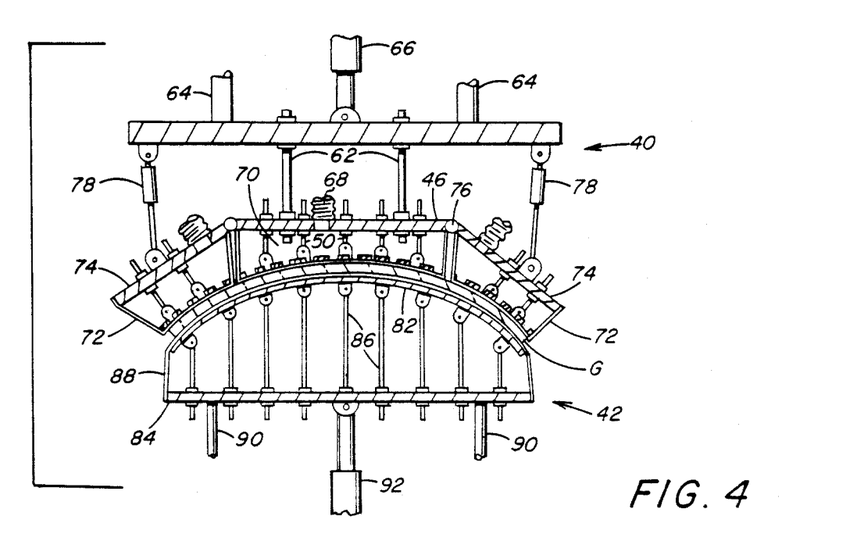
FIG. 4 is a view through line 3—3 in FIG. 1 showing the upper and lower mold in pressing engagement, with portion removed for clarity.

Referring to FIGS. 3 and 4, the press face 44 may also include pivoting wing sections 74, which pivot about hinges 76 in mounting plate 48 and are activated by pistons 78 which are connected between mounting plate 48 and back plate 60. The wing sections 74 are moved from an open non-engaging position as shown in FIG. 3 to a closed, pressing position as shown in FIG. 4 in a manner to be discussed later. In such an arrangement, the vacuum for the upper mold 40 may be drawn through the stationery non-pivoting portion of the mold 40 as well as the wing sections 74. The wing sections 74 may be sealed and provided with a vacuum arrangement as previously discussed. With the latter configuration, the entire glass sheet is engaged by vacuum even though the upper mold 40 includes wing sections 74.

While the mold construction described in connection with upper mold 40 includes a flexible wall member 46, one skilled in the art will appreciate that the invention is not necessarily so limited and that an alternate mold construction may be used for the upper mold 40. Such a construction would include materials that provide and maintain a smoothly surfaced contour and good durability despite intermittent contact with hot glass which causes rapid cyclic temperature variations over an extended period. Although not limiting in the present invention, an alternate configuration of the upper mold 40 may be constructed in a manner similar to that disclosed in U.S. Pat. No. 4,265,650 to Reese et al, which teachings are hereby incorporated by reference. In particular, upper mold 40 may include an apertured ceramic press face (not shown) and an enclosed interior vacuum chamber secured to a mounting plate.

The lower mold 42 is a full surface mold with an upwardly facing male press face 80, i.e., press face 80 is generally convex upward in elevation as shown in FIGS. 1 and 3. The surface of the press face 80 complements the surface of the female press face 44 of the upper mold 40. The lower mold 42 may be constructed in a manner similar to that of the upper mold 40 as described, supra. Referring to FIG. 3, an imperforate flexible wall member 82 constructed from any flexible heat resistant material, for example steel, is adjustable connected to a mounting plate 84 by connectors 86, which may adjust the surface contours of the press face 80 in a manner similar to that in upper mold 40. The lower mold 42 is covered with a refractory cloth cover 88, such as fiberglass, to insulate the glass from the mold. The cover 88 is drawn across press face 80 and secured to mounting plate 84 of the mold 42 in any convenient manner, for example, clamps. The mounting plate 84 is suitably connected through lower vertical guides 90 to a support frame (not shown) and is movable relative thereto by a lower piston 92.

As an alternative, the lower mold 42 may be constructed in a manner similar to that discussed, supra, with respect to upper mold 40. In particular, the mold 42 may include a ceramic press face (not shown) secured to mounting plate.

Referring to FIG. 1, the sheet transfer 26 includes a tempering ring 94 which may positioned beneath upper vacuum mold 40 after the glass sheet is pressed between molds 40 and 42 to receive the shaped glass sheet G and convey it to the cooling station 22 where it is rapidly cooled to provide a temper. The cooling station 22 includes a plenum 96 and nozzles 98 to direct cooling fluid at the major surface of the shaped glass sheet G.

This shaping arrangement allows for the shaping of heat softened glass sheets into complex and compound curvature configurations such as reverse curvatures, deep wraps, small radius bends, etc. that were previously difficult to fabricate using conventional shaping techniques and equipment. It has been found that in order to impart such complicated configurations in a glass sheet G using mold arrangements with an upper mold having a male press face and a lower mold having a female press face, portions of the glass must be heated to temperatures higher than the remaining portion of the glass sheet in order to bend the sheets as required. In addition, the practice of bending the end sections of the glass sheet upward to form the deep wrap sections of the glass is opposed by the natural tendency of the glass to sag downwardly under the force of gravity. As taught in the present invention, by depositing the glass sheets G on a lower mold with a full surface male press face, the glass sheet G will naturally to sag downward and conform to the shape of the press face of the lower mold 42 due to gravity. As the upper mold 38 moves downward to press the glass between the upper female press face and lower male press face, it further forces the glass, and in particular the end portions of the glass, in the direction in which it would normally sag. The glass is thereby shaped in a generally concave downward elevational configuration as can be seen from the shape of molds 40 and 42 and phanton line 99 on tempering ring 94 indicating the general shape of the shaped glass sheet in FIG. 1.

Figure 5:
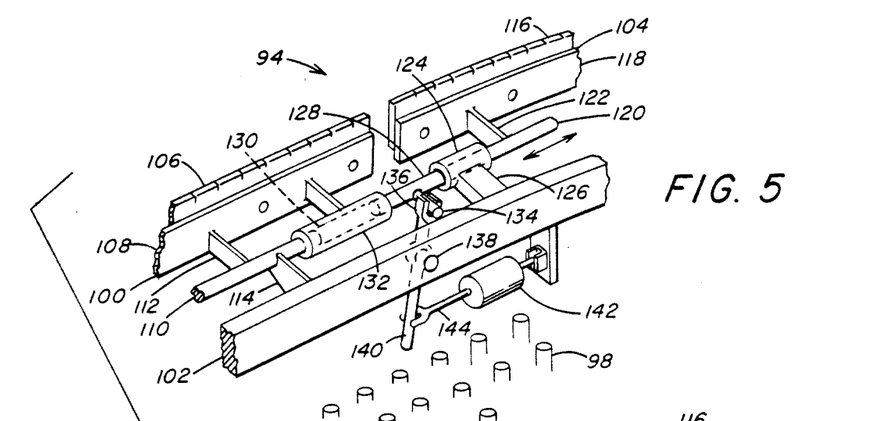
FIGS. 5 through 7 are enlarged isometric views illustrating the tempering ring according to the present invention, with portions removed for clarity. Each figure shows one particular preferred embodiment of the invention.

Immediately after shaping while the shaped glass sheet G is still at an elevated temperature, the entire glass sheet is expanded to be slightly larger than its final dimensions. As it cools in the cooling station 22, it shrinks and contracts to its final configuration. The dimensional change is most noticeable along the longitudinal dimension of the glass sheet. It has been observed that a glass sheet 80 inches (203 cm) long and shaped to have a 8 to 9 inch (20.3 to 22.9 cm) deep wrap may shrink on the order of ⅝ inch (1.6 cm) along its longitudinal direction. In order to compensate for these dimensional changes, the tempering ring must be able to expand and contract. Although not limited in the present invention, in the particular embodiment illustrated in FIGS. 2 and 5, the tempering ring 94 is split into two halves with portion 100 rigidly secured to a main frame 102 and a portion 104 slidingly supported by the main frame 102. In particular, glass sheet engaging member 106 of portion 100 is secured to bar member 108 which in turn is secured to the intermediate frame 110 by stud members 112. The intermediated frame 110 in turn is rigidly secured to the main frame 102 by posts 114. Glass sheet engaging member 116 of the sliding portion 104 of the tempering ring 92 is secured to bar member 118 which in turn are secured to intermediate frame 120 by stud members 122. The intermediated frame 120 is supported by collar members 124 that are secured to main frame 102 by posts 126 such that the intermediate frame 120 can slide relative to the main frame 102 via the collars 124. At the interface between the stationery portion 100 and sliding portion 104, bar 128 extends through the collars 124 and into a corresponding aperture 130 in a collar 132 fixed to the end of the intermediate frame 110 of the rigid portion 100 such that the bar 128 can slide in and out of the collar 132. Finger member 134 extends from the bar member 128 and is captured by yoke member 136 which is pinned to the main frame 102 at pivot point 138 as shown in FIG. 5. When leg member 140 of the yoke member 136 is moved to the left as viewed in FIG. 5, portions 100 and 104 of the tempering ring 94 move further apart, while if the leg member 140 is moved to the right, portions 100 and 104 of the tempering ring 94 move closer together. In this fashion, the tempering ring 94 can be made to expand or contract as required for the shaped glass sheet G.

Yoke member 136 may be pivoted by a variety of mechanisms. In the particular embodiment illustrated in FIG. 5, an actuator such as an electric or fluid cylinder 142, with arm member 144 pinned to leg 140, may be used to pivot the yoke 138 to change the dimensions of the tempering ring 94. As an alternative, guides (not shown) may be positioned within the cooling station 22 to rotate the yoke member 136 and change the dimensions of the tempering ring 94 from its expanded configuration to its contracted configuration as it moves through the cooling section 22.

The tempering ring 94, as taught in the present invention, contracts in response to the changing dimensions of the shaped glass sheet it supports as the glass sheet cools. Conventional tempering ring configurations support shaped glass sheets on the convex surface of the sheet and the glass is generally sagged or shaped so as to extend downward within the ring as it is supported thereon. As a result, any shrinkage of the glass sheet will result in the glass simply sliding over the sheet engaging surface of the tempering ring. As can be seen in FIGS. 1 and 2 in the present invention, the glass sheet is shaped in a concave downward orientation and is supported on its concave surface with the glass supported generally above the tempering ring. If the tempering ring 94 had only a single expanded configuration, as the glass sheet began to contract, it would break since the tempering ring configuration would be larger than the final glass configuration. If the tempering ring 94 was fixed in a contracted configuration, then the shaped glass sheet initially dropped on the tempering ring after shaping would be oversized and would not be properly supported about its peripheral edge immediatory after shaping such that additional sag may occur and the glass sheet would lose its desired configuration. With the tempering ring 94 as taught in the present invention, the tempering ring 94 is in its initial expanded configuration when the glass sheet is shaped and initially deposited on the tempering ring 94 and the tempering ring 94 may contract to a final configuration so as to accommodate the final shaped glass dimensions after cooling.

Figure 6:
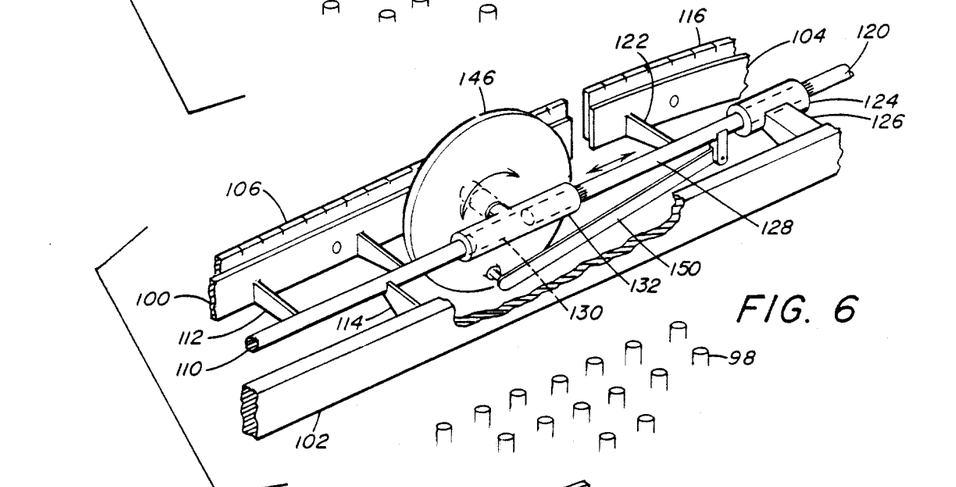

It should be appreciated by one skilled in the art that the expansion and contraction mechanism of the present invention is not limited to the specific configuration shown in FIG. 5. It is contemplated that the arrangement in FIG. 5 may be modified as is shown in FIG. 6 which shows the portion 104 of the tempering ring 94 attached to plate assembly 146 through linkage member 150 which is pinned between sliding intermediate frame 120 and plate 146. As can be seen, by rotating plate assembly 146 in any convenient manner known in the art in a counterclockwise direction, the sliding portion 104 of the tempering ring 94 slides along the intermediate frame 120 through the collars 126 and towards the stationary portion 100 of the tempering ring 94. When the plate assembly 146 is rotated in a clockwise direction, the sliding portion 104 of the tempering ring 94 moves away from the stationary portion 100.

The embodiment of the invention illustrated in FIG. 5 may also be modified by eliminating the yoke member 136 and directly connecting intermediate frame 110 of stationery portion 100 with intermediate frame 120 sliding portion 104 with stepping motors or actuators (not shown), e.g., fluid cylinders, to expand and contract the tempering ring 94.

Figure 7:
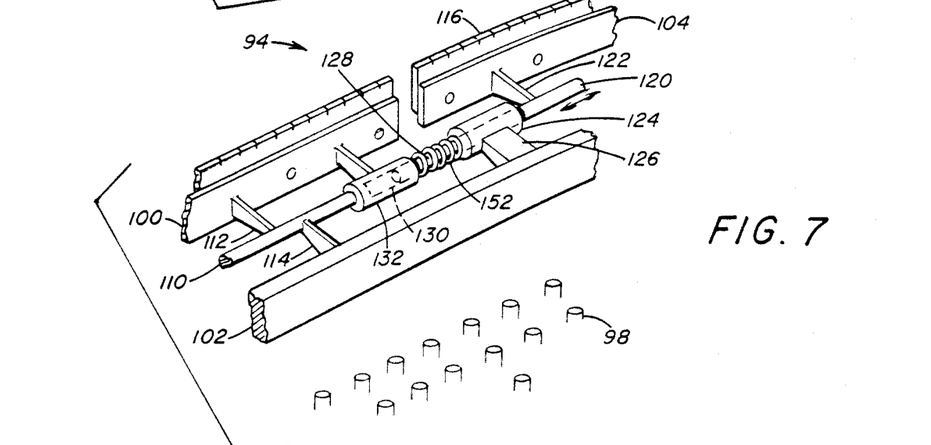

In addition, it is contemplated that a biasing means may be used to change the configuration of the tempering ring 94. Referring to FIG. 7, the tempering ring 92 may be arranged in its expanded configuration with a biasing arrangement, e.g., a spring 152, positioned so as to bias the portions 100 and 104 of the tempering ring 94 into an expanded configuration. The spring constant of the springs 152 would be sized such that the force exerted on the tempering ring 94 by the shaped glass sheet G as it cools would be sufficient to contract the springs 152. After the glass sheet G is removed from the tempering ring 94, it resumes its initial, expanded configuration.

In operation, a series of glass sheets G pass serially through the furnace 20 where they are heated to their heat softened temperature. Sensing device 30 senses a first glass sheet as it approaches the vacuum pick-up 36. When properly positioned beneath the pick-up 36, the glass sheet G is engaged by the pick-up 36 and transferred to the shaping station 24. If required, sensing mechanism 30 may start a timing sequence that, in effect, slows the conveying rate of the glass sheet G just prior to its engagement with the pick-up 36 so as to provide more accurate positioning of the glass sheet G relative to the pick-up 36.

The vacuum pick-up 36 conveys the glass sheet G into the shaping station 24 where the vacuum is discontinued and the glass sheet G is deposited on the male press face 80 of the lower mold 42. Vacuum pick-up 36 moves out of the shaping station 24, preferably back into the furnace, to prepare for the next glass sheet G. When the vacuum pick-up 34 has moved out of the shaping station 24, the upper mold 40 moves downward and/or the lower mold 42 moves upward to press the heat softened glass sheet G between the female press face 44 of the upper mold 40 and male press face 80 of lower mold 42. If the upper mold 40 includes pivoting wing portion 74 as illustrated in FIG. 2, pistons 76 rotate the wing sections 74 from an upward position as seen in FIG. 3 to a downward position as shown in FIG. 4 as the mold 40 moves downward to press the glass sheet G.

Vacuum is drawn through the apertured wall member 46 of the upper mold 40 to hold the shaped glass sheet G thereagainst. After shaping, the molds separate and the tempering ring 94 in its expanded configuration is positioned beneath the mold 40 to receive the shaped glass sheet from the mold 40. Depending on the shape and curvature of the glass sheet to be shaped, the tempering ring 94 may have to be contracted in order to be positioned beneath the mold 40 prior to it extending into its expanded configuration. The vacuum in mold 40 is discontinued and the glass sheet drops onto the tempering ring 94 which then conveys the shaped glass G into the cooling station 22 where it is rapidly cooled to impart a temper. As the shaped glass sheet G cools and contracts, tempering ring 94 contracts so as to continue to provide peripheral support to the glass sheet while maintaining the proper edge configuration. If required, the tempering ring 94 may be further contracted after the glass sheet has been cooled and has assumed its final dimensions so as to make it easier to remove the shaped glass sheet.

It should be appreciated that although the present invention is illustrated with respect to shaping a glass sheet between an upper female mold and lower male mold and supporting the shaped glass sheet on its concave surface with an adjustable tempering ring, it is obvious that the teachings of this invention may be applied to the horizontal press bending of glass sheets using conventional shaping mold and tempering ring configurations as discussed supra, i.e., a male upper mold and female lower mold to form a concave upward glass sheet. It is apparent that the breakage of the glass sheet due to shrinkage would not be a concern since the glass sheet may slide over the supporting surface of the tempering ring during cooling, but the adjustable features of the tempering ring will ensure that the shaped glass sheet is properly supported both immediately after shaping and after cooling so as to maintain its final desired configuration.

The form of this invention shown and described in this disclosure represents an illustrative preferred embodiments and various modifications thereof. For example, it is contemplated that both halves of the tempering ring in the present invention may be slideably mounted relative to each other. In addition, the tempering ring may have a stationery center portion with sliding end portions. It is understood that various changes may be made without departing from the scope of the invention, as defined by the claimed subject matter which follows.

I claim:

1. An apparatus for shaping heat softened sheet material comprising:

means to heat said sheet to its heat softened temperature;

means to transfer said sheet to a shaping station including;

an upper vacuum mold with a shaping surface having a generally concave downward elevational configuration corresponding to a desired configuration of said sheet; and a lower mold with a shaping station complementing said shaping surface of said upper mold;

means to press said sheet between said upper and lower molds;

a support ring having a sheet supporting surface with an elevational contour corresponding to the contour of said shaped sheet slightly inboard of said sheet perimeter immediately after shaping;

means to move said ring from a first position between said upper and lower moles to a second position adjacent said upper and lower molds;

means to deposit said sheet on said ring when said ring is in said first position; and means to cool said sheet while supported on said ring when said ring is at said second position.

2. The apparatus as in claim 1 further including means to adjust said ring, while supporting said hot shaped sheet, from a first configuration wherein said ring support said sheet while said sheet is in an expanded configuration immediately after shaping to a final configuration corresponding substantially to the final desired contour of said sheet after cooling.

3. The apparatus as in claim 1 wherein said ring includes a first glass sheet supporting portion mounted on a frame and a second glass sheet support portion mounted on said frame and said means to adjust includes means to move said first and second portions relative to each other such that as said ring adjusts from said expanded configuration to said final configuration, said first and second portions move toward each other.

4. The apparatus as in claim 3 wherein said adjusting means includes means to automatically adjust the configuration of said ring.

5. The apparatus as in claim 4 wherein said sheet material is a glass sheet.

6. A tempering ring for supporting hot shaped sheet material having a generally concave downward elevational configuration comprising:

means to support said shaped sheet slightly inboard of said sheet perimeter;

first means to mount a first portion of said support means to a frame;

second means to mount a second portion of said support means to said frame; and means to slideably move said first and second portions of said support means relative to each other while supporting said hot shaped sheet.

7. The tempering ring as in claim 6 wherein said first mounting means includes means to rigidly mount said first portion of said support means to said frame and said second mounting means includes means to slideably mount said second portion of said support means to said frame and said moving means includes means to move said second portion of said support means relative to said first portion.

8. The tempering ring as in claim 7 wherein said frame is a main frame, said first portion of said support means is rigidly secured to a first intermediate frame which is secured to said main frame and said second portion of said support means is rigidly secured to a second intermediate frame which is slideably mounted to said main frame.

9. The tempering ring as in claim 8 wherein said second intermediate frame includes a bar member extending from said second intermediate frame and aligned with an aperture in a sleeve secured to said first intermediate frame.

10. The tempering ring as in claim 9 further including means to automatically move said second portion of said support means relative to said first portion.

11. The tempering ring as in claim 10 wherein said automatic means includes an actuator to move said second portion relative to said first portion so as to contract and expand said tempering ring.

12. The tempering ring as in claim 11 wherein said sheet material is a glass sheet.

13. The apparatus as in claim 11 wherein said bar includes a finger member engaged by a yoke member pivotally connected to said mainframe such that when said yoke member is pivoted in a first direction said first and second portions move towards each other, and when said yoke member is pivoted in opposite direction said first and second portions move away from each other.

14. The tempering ring as in claim 11 wherein said actuator includes a fluid cylinder.

15. The tempering ring as in claim 7 wherein said moving means includes means to bias said second portion relative to said first portion.

16. The tempering ring as in claim 15 wherein said biasing means includes spring members.

17. The tempering ring as in claim 6 wherein said support means has an elevational contour corresponding to the shape of said shaped sheet slightly inboard of the shaped sheet perimeter.

18. The tempering ring as in claim 17 wherein said support means has an elevational contour to support a shaped sheet having a generally concave downward elevational configuration.

19. A method of shaping heat softenable sheet material comprising:

heating said sheet to its heat softened temperature;

positioning said heat softened sheet at a shaping station including an upper mold with a shaping surface having a generally concave downward elevational configuration and a vertically aligned lower mold with a shaping surface generally complementing the shaping surface of said upper mold;

pressing said sheet between said upper and lower molds;

depositing said shaped sheet on a support ring;

removing said ring with said shape sheet supported thereon from said shaping station; and cooling said sheet.

20. The method as in claim 19 wherein said upper mold is an upper vacuum mold and said depositing step includes drawing a vacuum through said upper mold to hold said shaped glass sheet thereagainst after pressing, positioning said ring beneath said upper mold and discontinuing said vacuum to deposit said shaped sheet on said ring, said tempering ring.

21. The method as in claim 20 further including the step of adjusting the configuration of said ring from a first configuration corresponding to the contour of said shaped sheet immediately after said shaping step to a second configuration corresponding substantially to the contour of said shaped sheet while said ring supports said shaped sheet during said cooling step.

22. A method of supporting hot shaped sheet material comprising:
  supporting the periphery of said shaped sheet on a tempering ring in an initial configuration immediately after shaping while said sheet is in a shaped and expanded configuration;
  cooling said shaped sheet such that said sheet shrinks in dimensions; and
  adjusting said tempering ring to a final configuration such that said ring supports said sheet about said periphery after said sheet has been cooled.

23. The method as in claim 22 wherein said adjusting step occurs during said cooling step.

24. The method as in claim 23 wherein the rate of said adjustment of said tempering ring corresponds with the rate of shrinkage of said shaped sheet.

25. The method as in claim 24 wherein said tempering ring includes a first sheet engaging portion and a second sheet engaging portion and further wherein said adjusting step includes the step of moving said first and second portions from a first position corresponding to said initial configuration, towards each other to correspond to said final configuration.

26. The method as in claim 25 further including the step of biasing said first portion away from said second portion wherein said adjusting of said tempering ring from said initial to said final configuration moves said first and second portions in a direction opposed by said biasing and said tempering ring returns to said initial configuration after said sheet is removed from said tempering ring.

* * * * *